(12) United States Patent
Balani et al.

(10) Patent No.: US 8,341,269 B2
(45) Date of Patent: Dec. 25, 2012

(54) CONFIGURING CLOUD RESOURCES

(75) Inventors: Naveen G. Balani, Mumbai (IN);
Archana Kumar, Bangalore (IN); Vijay K. Sukthankar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 258 days.

(21) Appl. No.: 12/727,609

(22) Filed: Mar. 19, 2010

(65) Prior Publication Data

US 2011/0231525 A1 Sep. 22, 2011

(51) Int. Cl.
*G06F 15/173* (2006.01)
*G06F 15/177* (2006.01)
*G06F 7/00* (2006.01)

(52) U.S. Cl. .......................... 709/226; 709/220; 707/609

(58) Field of Classification Search .................. 709/226, 709/229, 223; 707/101, 609
See application file for complete search history.

(56) References Cited

U.S. PATENT DOCUMENTS

| | | | |
|---|---|---|---|
| 7,177,867 B2 | 2/2007 | Stringer-Calvert et al. | |
| 7,499,968 B1* | 3/2009 | Alexander et al. | 709/203 |
| 2006/0036633 A1* | 2/2006 | Chong et al. | 707/101 |
| 2006/0074876 A1 | 4/2006 | Kakivaya et al. | |
| 2008/0040308 A1* | 2/2008 | Ranganathan et al. | 707/1 |
| 2008/0080396 A1* | 4/2008 | Meijer et al. | 370/254 |
| 2008/0082490 A1 | 4/2008 | MacLaurin et al. | |
| 2009/0177634 A1 | 7/2009 | Behrendt et al. | |
| 2009/0177777 A1 | 7/2009 | Behrendt et al. | |
| 2010/0077078 A1* | 3/2010 | Suit et al. | 709/224 |
| 2010/0217865 A1* | 8/2010 | Ferris | 709/226 |
| 2010/0223276 A1* | 9/2010 | Al-Shameri et al. | 707/769 |
| 2011/0016214 A1* | 1/2011 | Jackson | 709/226 |
| 2011/0055398 A1* | 3/2011 | Dehaan et al. | 709/226 |

FOREIGN PATENT DOCUMENTS

EP 2107472 10/2009

OTHER PUBLICATIONS

Yusef Hassan-Montero et al.; "Improving Tag-Clouds as Visual Information Retrieval Interfaces"; International Conference on Multidisciplinary Information Sciences and Technologies, INSCIT2006; Spain; Oct. 25-28; 2006; http://www.nosolousabilidad.com/hassan/improving_tagclouds.pdf.

Freddy Limpens et al.; "Bridging Ontologies and Folksonomies to Leverage Knowledge Sharing on the Social Web: A Brief Survery"; http://www.cs.tut.fi/sosea08/papers/paper2.pdf.

* cited by examiner

*Primary Examiner* — Joseph Avellino
*Assistant Examiner* — Aftab Nasir Khan
(74) *Attorney, Agent, or Firm* — Law Office of Jim Boice (57) ABSTRACT

A computer implemented method, system and/or program product configure cloud resources. A request is received for a specific set of cloud resources. The set of cloud resources comprises at least one cloud resource that has been associated with an ontological database. The ontological database defines descriptive terms for the cloud resource and describes relationships between the descriptive terms used by different cloud resources. An optimal set of cloud resources that satisfies the request is configured and saved for future usage in responding to requests for the specific set of cloud resources.

20 Claims, 6 Drawing Sheets

CONFIGURING CLOUD RESOURCES

BACKGROUND

The present disclosure relates to the field of computers, and specifically to computer resources. Still more particularly, the present disclosure relates to cloud computer resources.

BRIEF SUMMARY

A computer implemented method, system and/or program product configure cloud resources. A request is received for a specific set of cloud resources. The set of cloud resources comprises at least one cloud resource that has been associated with an ontological database. The ontological database defines descriptive terms for the cloud resource and describes relationships between the descriptive terms used by different cloud resources. An optimal set of cloud resources that satisfies the request is configured and saved for future usage in responding to requests for the specific set of cloud resources.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium (s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
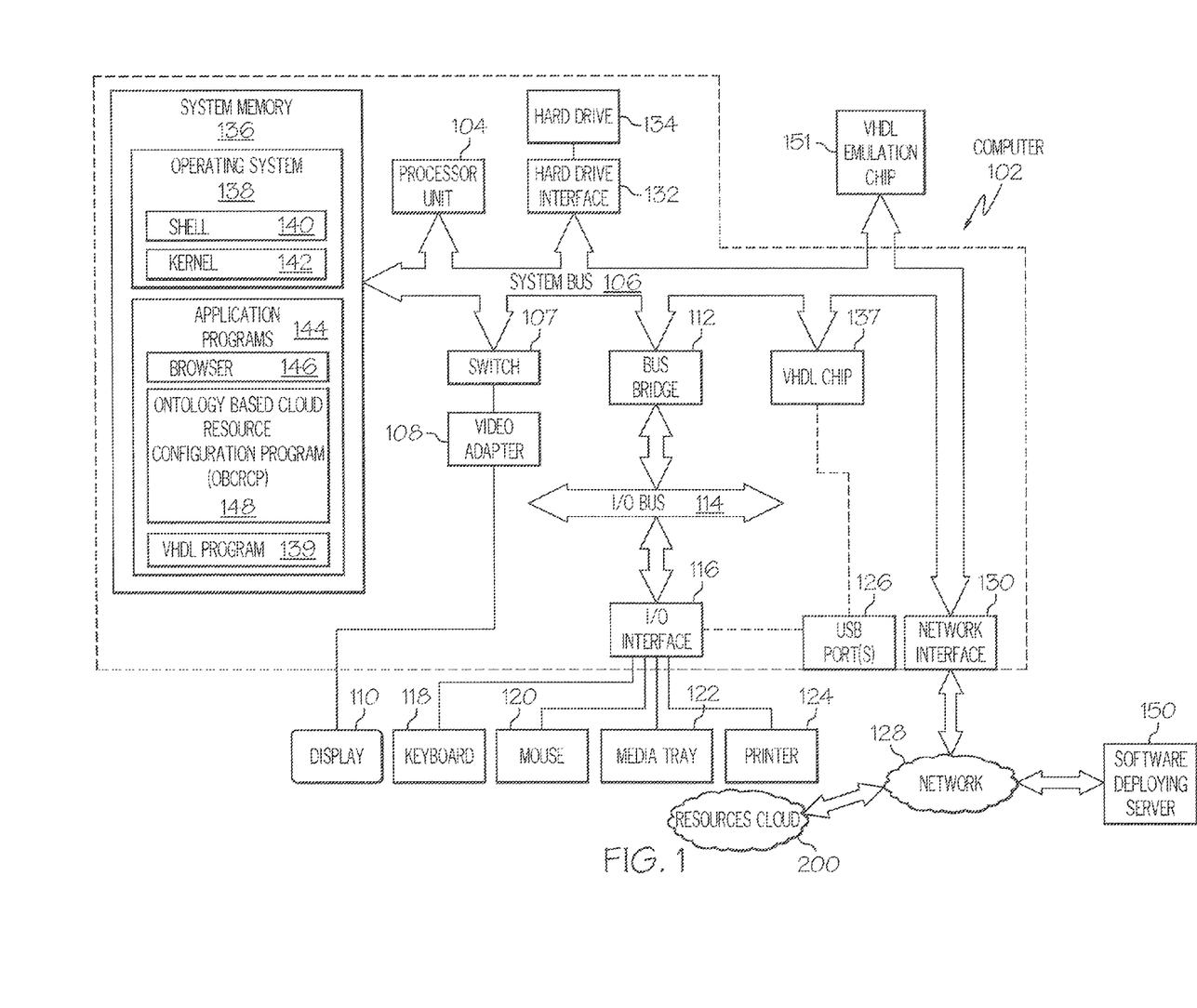
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150; cloud resources configuring computer 206, servers 208a-n and other computing resources depicted and described in FIG. 2; cloud resource 302, application servers 304, and other elements depicted in FIG. 3; and resource 404 depicted in FIG. 4

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., ontology based cloud resource configuration program—OBCRCP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 and a resources cloud 200 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include an ontology based cloud resource configuration program (OBCRCP) 148. OBCRCP 148 includes code for implementing the processes described below, including those described in FIGS. 2-6. In one embodiment, computer 102 is able to download OBCRCP 148 from software deploying server 150, including in an on-demand basis, such that the code from OBCRCP 148 is not downloaded until runtime or otherwise immediately needed by computer 102. Note further that, in one embodiment of the present disclosure, software deploying server 150 performs all of the functions associated with the present disclosure (including execution of OBCRCP 148), thus freeing computer 102 from having to use its own internal computing resources to execute OBCRCP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from OBCRCP 148 causes VHDL program 139 to configure VHDL chip 137, which may be an FPGA, ASIC, etc.

In another embodiment of the present disclosure, execution of instructions from OBCRCP 148 results in a utilization of VHDL program 139 to program a VHDL emulation chip 151. VHDL emulation chip 151 may incorporate a similar architecture as described above for VHDL chip 137. Once OBCRCP 148 and VHDL program 139 program VHDL emulation chip 151, VHDL emulation chip 151 performs, as hardware, some or all functions described by one or more executions of some or all of the instructions found in OBCRCP 148. That is, the VHDL emulation chip 151 is a hardware emulation of some or all of the software instructions found in OBCRCP 148. In one embodiment, VHDL emulation chip 151 is a programmable read only memory (PROM) that, once burned in accordance with instructions from OBCRCP 148 and VHDL program 139, is permanently transformed into a new circuitry that performs the functions needed to perform the process described below in FIGS. 2-6.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
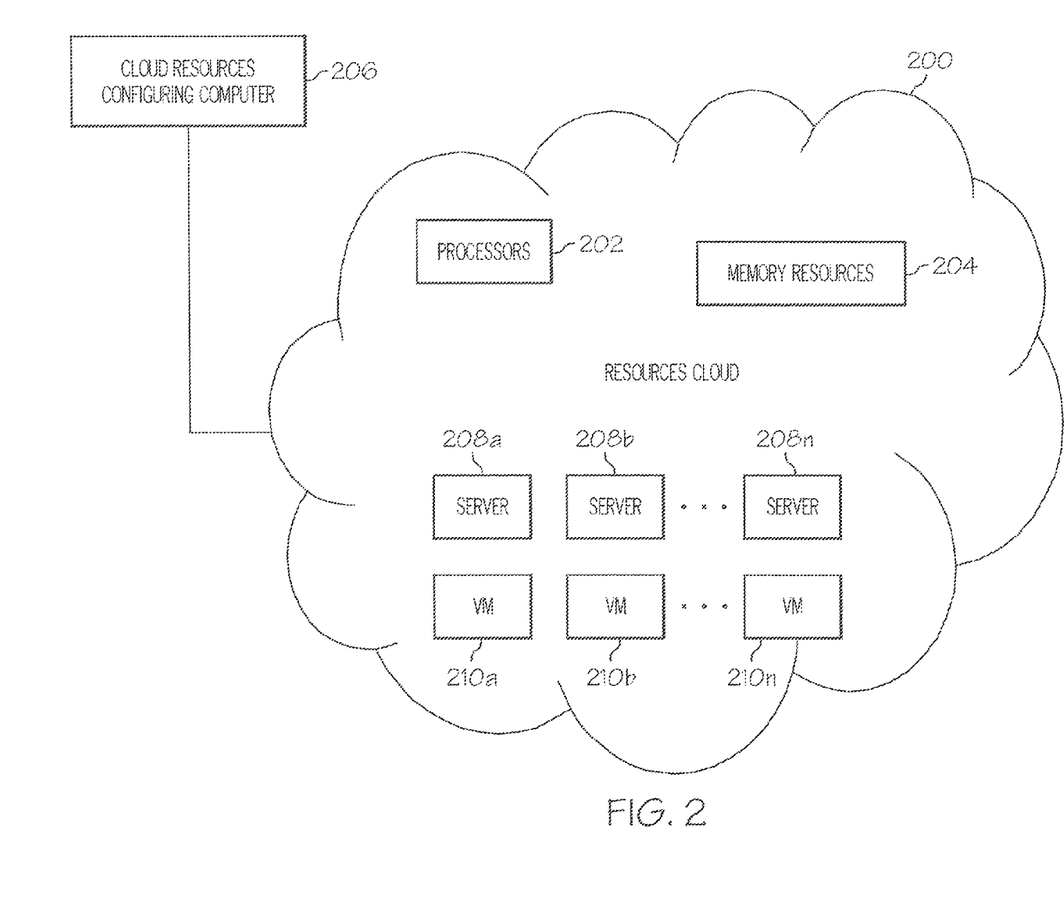
FIG. 2 illustrates an exemplary resource cloud as used in one embodiment of the present disclosure.

As shown in FIG. 2, a resource cloud 200 comprises processors 202, memory resources 204 (comprising system memory and/or secondary mass storage memory), and other resources (e.g., operating systems, network connections, etc.) that are available for use by a cloud resources configuring computer 206 when configuring real and/or virtual resources such as servers (208*a-n*, where "n" is an integer), and/or on virtual machines (VMs) 210*a-n*, (where "n" is an integer).

In one embodiment, the resources configured using the process described herein may be configured to satisfy a service level agreement (SLA), which is a level of ability/service (i.e., the capacity of cloud hardware and/or software) that is contractually guaranteed by a resource provider.

Figure 3:
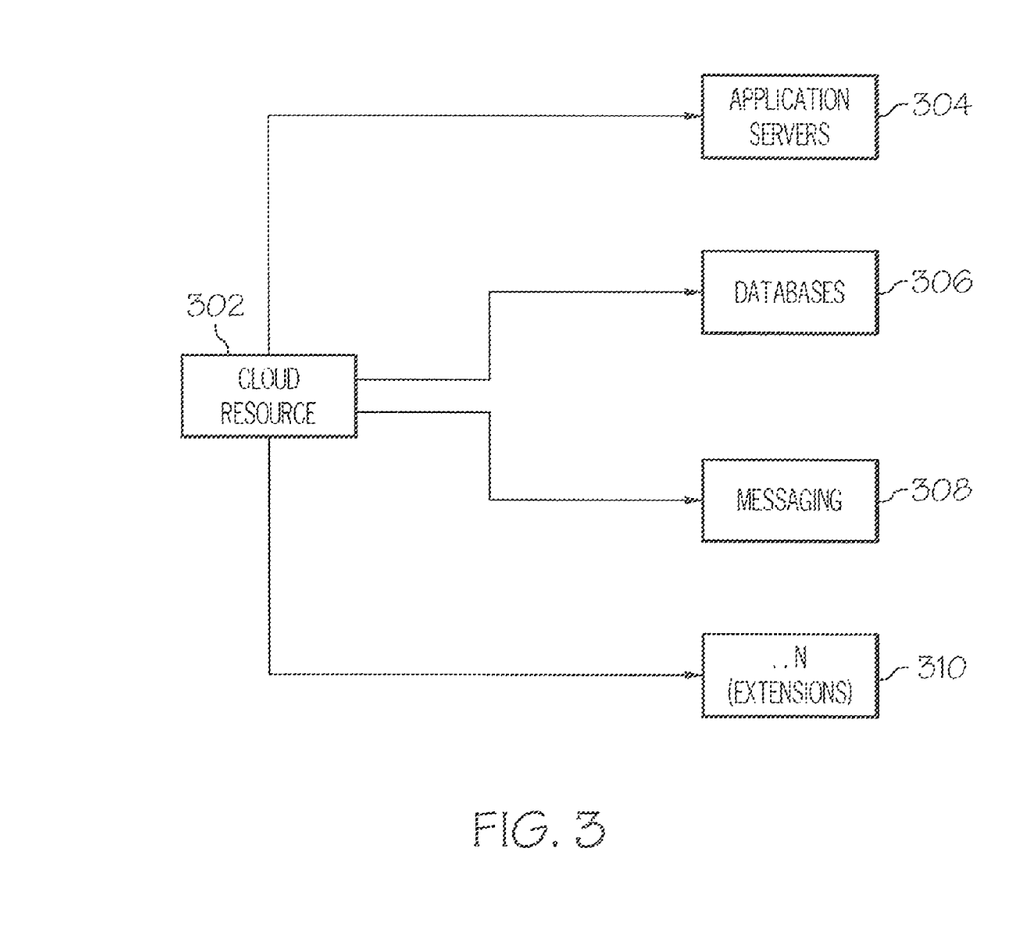
FIG. 3 depicts exemplary components of a resource in a resource cloud.

As depicted in FIG. 3, an exemplary cloud resource 302, located in the resources cloud 200 shown in FIG. 2, may comprise one or more of applications servers 304 (which may be real or virtual machines), databases 306 (either stored on a physical storage device or distributed across a virtual storage network), messaging 308 (i.e., e-mail service), and . . . N extensions 310 (software that enables a user to modify existing commands with extensions to create new commands).

Figure 4:
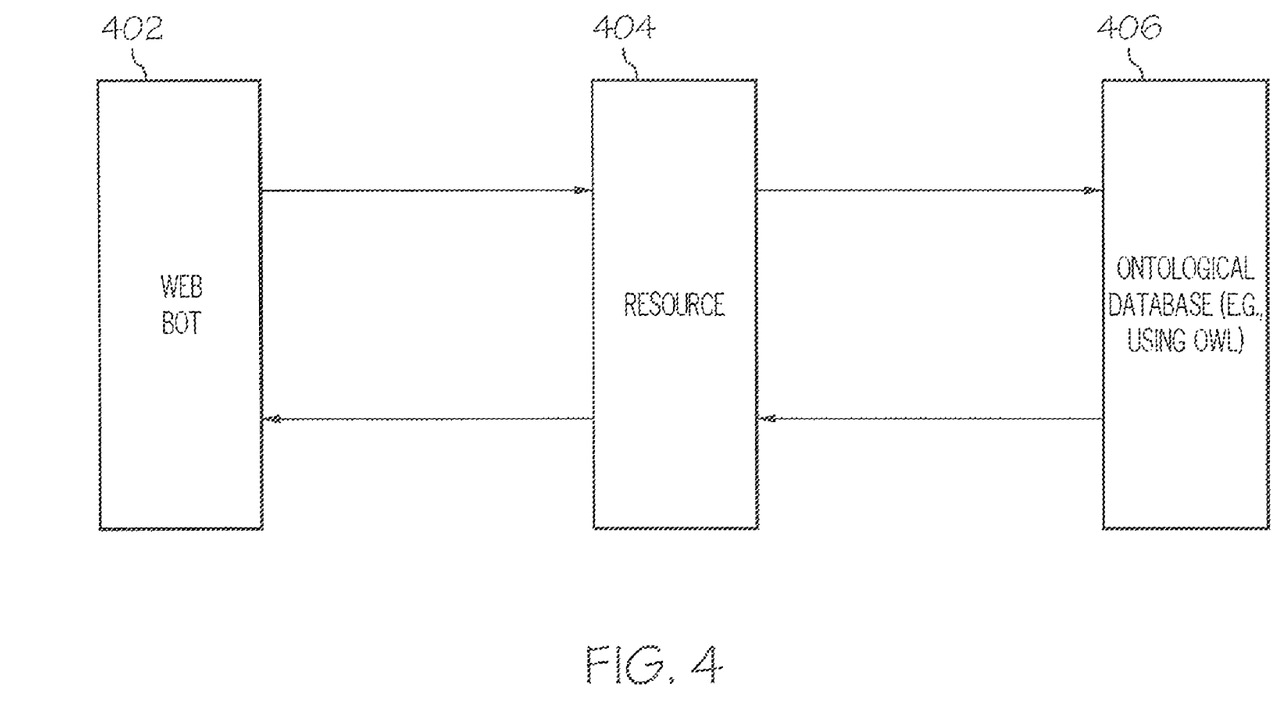
FIG. 4 depicts a relationship between a web bot used to locate a resource and an ontology resource used to identify that resource.
Figure 5:
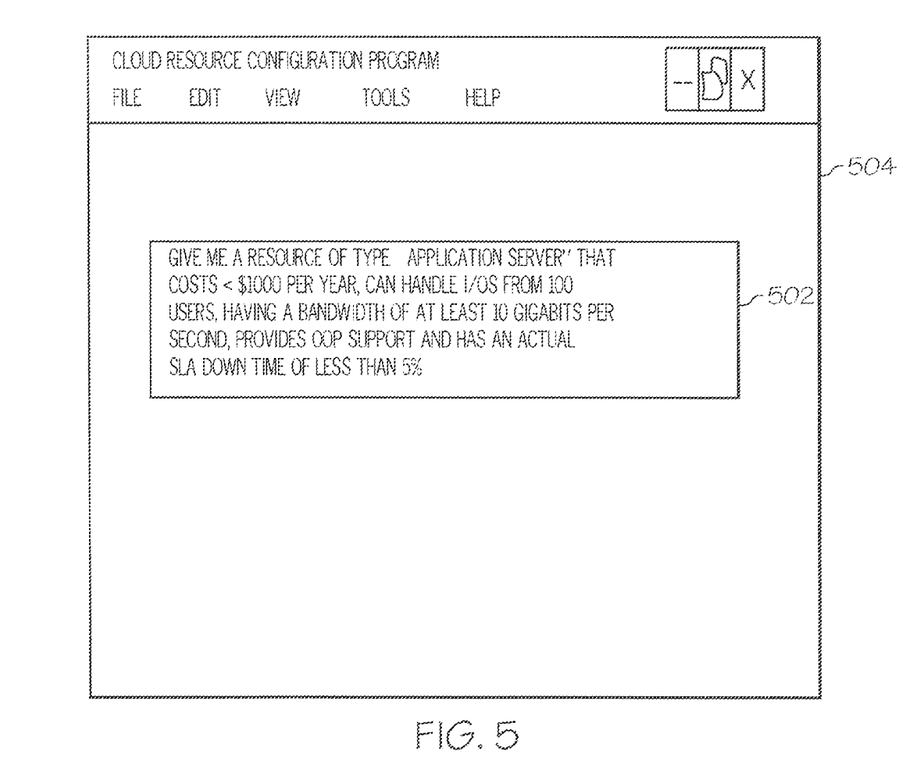
FIG. 5 illustrates an exemplary graphical user interface (GUI) used to search for a set of cloud resources.

With reference now to FIG. 4, an exemplary relationship is shown between a resource 404 and an ontological database 406 as contemplated in one embodiment of the present disclosure. Assume that Web Bot 402 has been deployed from the cloud resources configuring computer 206 shown above in FIG. 2. Web Bot 402 is an intelligent search logic, which may be part of OBCRCP 148 shown in FIG. 1, that is used to locate resources in a cloud (e.g., resources cloud 200 shown in FIG. 2) that meet the requirements of a requesting entity. For example, assume that a user has typed in "Give me a resource of type "Application Server" that costs <$1000 per year, can handle Input/Outputs interfacing (I/Os) from 100 users, having a bandwidth of at least 10 gigabits per second, provides OOP support and has an actual SLA down time of less than 5%", as typed into a data input box 502 in graphical user interface (GUI) 504. Assume also that GUI 504 is supported by OBCRCP 148 shown in FIG. 1, and is displayed on a display 110 of cloud resources configuring computer 206 (shown in FIG. 206) to directly locate and/or configure a requested set of cloud resources, or else on another user's computer's display (not shown) to indirectly locate and/or configure the requested set of cloud resources.

Returning to FIG. 4, when the Web Bot 402 "asks" resource 404 for an application server that meets the requisite features (costs <$1000 per year, can handle I/Os from 100 users, having a bandwidth of at least 10 gigabits per second, having a bandwidth of at least 10 gigabits per second, provides OOP support and has an actual SLA down time of less than 5%), resource 404 may or may not understand the context used. That is, resource 404 may know what £1000 (pound sterling) is, but not what $1000 (U.S. dollars) is. Similarly, resource 404 may or may not know that OOP is "Object Oriented Programming", even if it knows what a particular OOP (i.e., EJB 3.0) is. Furthermore, resource 404 may or may not know what the relationship is between handling I/Os from 100 users and having a bandwidth of at least 10 gigabits per second, which may be technically inter-dependent. In order to answer these and other issues/questions, resource 404 consults an ontological database 406, which may utilize the Web Ontology Language (OWL). OWL is an exemplary set of markup language (e.g., XML) elements and attributes that use standardized meanings to define terms and relationships. Thus, the ontological database 406 defines descriptive terms for the cloud resource, as well as relationships between the descriptive terms used by different cloud resources.

Figure 6:
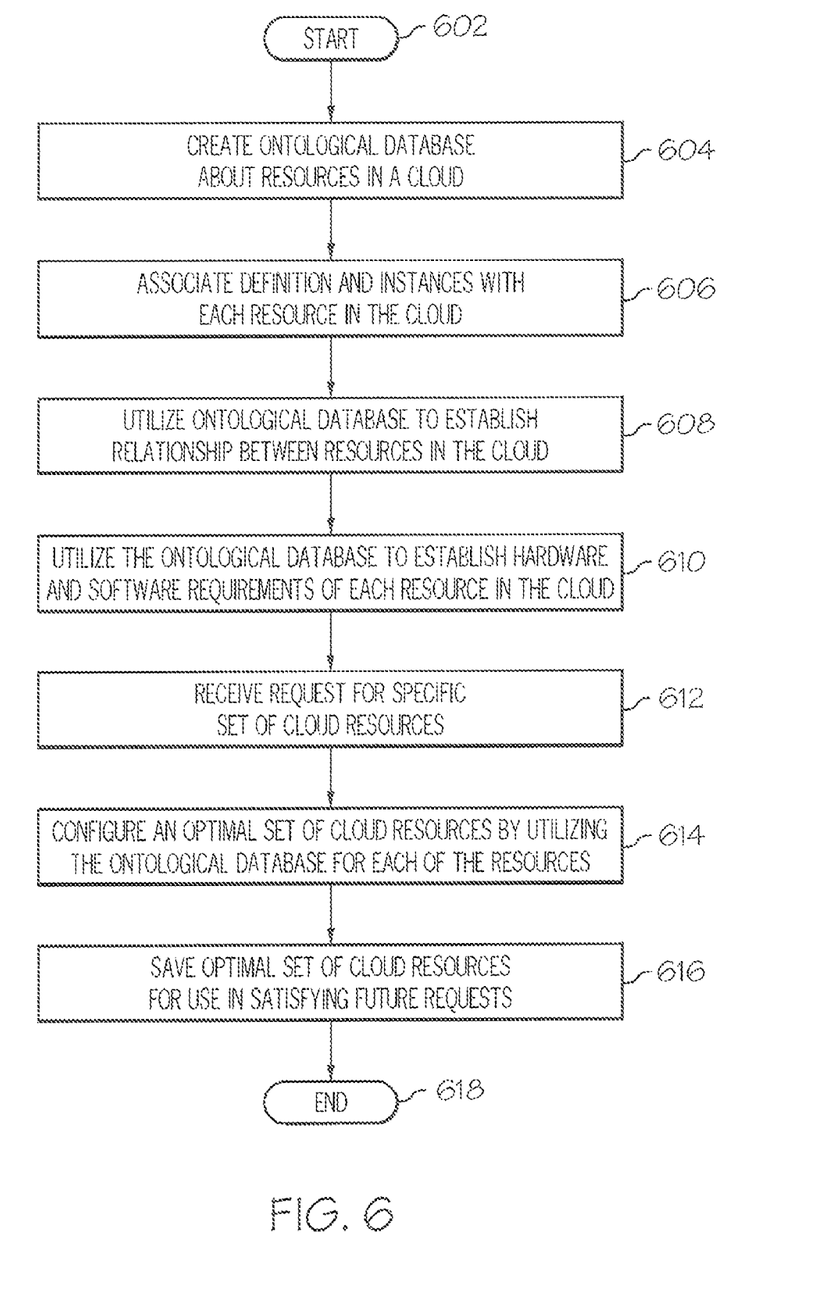
FIG. 6 is a high level flow chart of exemplary steps taken to configure cloud resources.

A description of how ontological database 406 is used to configure a set of cloud resources is depicted in a high-level flow chart shown in FIG. 6. After initiator block 602, an ontological database about cloud resources and relationships between the cloud resources is created (block 604). This ontological database (e.g., ontological database 406 shown in FIG. 4) provides a formal representation about cloud resources supported in a network of clouds. The representation can be realized using W3C OWL Web Ontology Language.

As described in block 606, each cloud resource is associated with a definition and instances (meta-data) information. For instance, in one embodiment the definition of a Application Resource is represented in OWL file and contains information such as:
Name
Version
EJB Container Support Web Container Support Portal Support
Vendor information
Concurrent users support per application
Managed node, stand-alone or Admin node
Pre-Configured heap size ASP Support
Other properties
Relationship with other resources
Cost factor
Performance high availability runtime
Actual high availability performance runtime
Processor Type of Processor
Memory Size The instance information contains the capabilities supported by the resource. For an application server, this instance information comprises:
Name—Web App Server
Version—6.0
EJB Container Support—3.0
Web Container Support—2.0
Portal Support—2.0
Vendor information—Company ABC
Concurrent users support per application—200
Managed node, stand-alone or Admin node—Stand-alone
Pre-configured heap size—512
ASP Support—No
Cost—1000 $ per application/year
Performance high availability runtime—99% availability
Actual high availability
performance runtime—95% availability Processor Type—x86/p6/p7
No of Processors—2/4/8
Memory Size—1024/2048/4096

The ontology definition also contains relationships between cloud resources in a cloud. For example, if an application server is part of cluster, a relationship between a cluster node in the cloud and the application server node would exist, and is described in the ontological database, as described in block 608.

As described in block 610, based on the classification of the cloud computing environment, requirements supported by a cloud computing environment can be inferred. That is, the ontological database provides a cross-referencing description of relationships of internal components of cloud resources, and also describes relationships (e.g., requisite co-components) of cloud resources needed by another cloud resource.

For example, a definition of cloud resource can be represented as a set of triples:
CloudResource type OWL:Class ApplicationServer typeOf CloudResource
Database typeOf CloudResource JMSMessagingProvider typeOf CloudResource Associated with each CloudResource type are the properties it supports, such as:
ApplicationServer hasName String
ApplicationServer hasVersion String
ApplicationServer hasPortalSupport float Associated with each CloudResource type is instance information, such as:
Resource1 type ApplicationServer
Resource1 hasName Company ABC Application Server
Resource1 hasVersion 7.0
Resource1 hasPortalSupport 6.2

Based on the information provided by the ontological database, if a cloud resource provider receives a request for a specific set of cloud resources (e.g., an application server capable of handling 100 users for less than $1000 per year, while meeting the SLA of being "up" at least 95% of the time), then an optimal set of cloud resources that meet these requirements can be configured by utilizing the ontological database for each of the resources in a cloud (block 614). Resources meeting these requirements that are supported by the cloud environment can be dynamically pulled off by scanning the OWL meta-data.

As described above, the process for finding resource types that are supported can be performed by presenting a screen (to a cloud administrator) to select the Types required for satisfying the request. For each type selected, a screen may be presented for selecting properties associated with that type of resource. The selection, as well as the client requirements, can be stored for matching to cloud resources (using the ontological database as described above).

As described in block 616, the optimal set of cloud resources are then saved (i.e., a map to where the components are located as well as directions for assembling them into the desired resource set) for future usage in responding to requests for that same specific set of cloud resources. The process ends at terminator block 618.

Note that the "set of cloud resources" may be a set of multiple cloud resources, or it may be a single cloud resource, such as a virtual application server, a database (virtual or real), a messaging service, an extension to a set of software instructions, etc.

In one embodiment, the cost factor associated with each resource can be used for metering capability and charging of resources in cloud computing environment. This cost factor, which may be part of an SLA, can also be described in the ontological database, allowing different SLA terms to be cross-integrated across different cloud resources. Similarly, the ontological database can be used in comparing the terms in the SLA with terms describing the configured set of cloud resources, in order to determine which set of cloud resources best fits the SLA requirements, and thus is the optimal set of cloud resources.

Note that using semantic web concepts such as the ontological database described herein, interoperability between resources in cloud computing can be computed to determine if two resources can be integrated to provide a solution. For example, a new application server added to the cloud network can be discovered and added to application clusters that support that a specific version of application server. Furthermore, performance runtime and actual performance runtime capability can be used to determine which resource is being utilized in a cloud computing environment and whether it is meeting the required SLA stated during registration.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method of configuring cloud resources, the computer implemented method comprising:
   receiving a request for a set of cloud resources, wherein the set of cloud resources comprises at least one cloud resource that has been associated with an ontological database, wherein the ontological database defines descriptive terms for said at least one cloud resource, wherein the ontological database describes relationships between the descriptive terms used by different cloud resources, wherein the ontological database describes requisite co-components required by two cloud resources, wherein the ontological database contains a definition of an application resource in the cloud resources, and wherein the definition of the application resource comprises a name of the application resource, a version number of the application resource, an enterprise java bean (EJB) container support version number of the application resource, a web container support version number of the application resource, a portal support version number of the application resource, a maximum number of users supported by the application resource, a high availability runtime of the application resource, an actual availability performance runtime of the application resource, a number of processors required by the application resource, and a memory size required by the application resource;
   a processor configuring an optimal set of cloud resources that satisfies the request, wherein the optimal set of cloud resources is defined as being available to a user at least 95% of the time; and
   saving the optimal set of cloud resources in a computer-readable storage device for future usage in responding to requests for the set of cloud resources.

2. The computer implemented method of claim 1, wherein the ontological database utilizes Web Ontology Language (OWL).

3. The computer implemented method of claim 1, further comprising:
   utilizing the ontological database to establish hardware and software requirements for at least one cloud resource in the set of cloud resources.

4. The computer implemented method of claim 1, wherein the set of cloud resources comprises multiple cloud resources.

5. The computer implemented method of claim 1, wherein the set of cloud resources are located by a web bot.

6. The computer implemented method of claim 1, wherein the set of cloud resources comprises a single cloud resource.

7. The computer implemented method of claim 6, wherein the single cloud resource is a virtual application server.

8. The computer implemented method of claim 6, wherein the single cloud resource is a database.

9. The computer implemented method of claim 6, wherein the single cloud resource is a messaging service.

10. The computer implemented method of claim 6, wherein the single cloud resource is an extension to a set of software instructions, wherein the extension enables a user to modify an existing command to create a new command.

11. A computer program product for configuring cloud resources, the computer program product comprising:
   a computer readable storage media;
   first program instructions to receive a request for a set of cloud resources, wherein the set of cloud resources comprises at least one cloud resource that has been associated with an ontological database, wherein the ontological database defines descriptive terms for said at least one cloud resource, wherein the ontological database describes relationships between the descriptive terms used by different cloud resources, wherein the ontological database describes requisite co-components required by two cloud resources, wherein the ontological database describes requisite co-components required by two cloud resources, wherein the ontological database contains a definition of an application resource in the cloud resources, and wherein the definition of the application resource comprises a name of the application resource, a version number of the application resource, an enterprise java bean (EJB) container support version number of the application resource, a web container support version number of the application resource, a portal support version number of the application resource, a maximum number of users supported by the application resource, a high availability runtime of the application resource, an actual availability performance runtime of the application resource, a number of processors required by the application resource, and a memory size required by the application resource;
   second program instructions to configure an optimal set of cloud resources that satisfies the request, wherein the optimal set of cloud resources is defined as being available to a user at least 95% of the time; and
   third program instructions to save the optimal set of cloud resources in a computer-readable storage device for future usage in responding to requests for the set of cloud resources; and wherein
said first, second and third program instructions are stored on said computer readable storage media.

12. The computer program product of claim 11, wherein the ontological database utilizes Web Ontology Language (OWL).

13. The computer program product of claim 11, further comprising:
   fourth program instructions to utilize the ontological database to establish hardware and software requirements for at least one cloud resource in the set of cloud resources, wherein said fourth program instructions are stored on said computer readable storage media.

14. The computer program product of claim 11, wherein the set of cloud resources comprises a single cloud resource.

15. The computer program product of claim 11, wherein the set of cloud resources comprises multiple cloud resources.

16. A computer system comprising:
   a processor, a computer readable memory, and a computer readable storage media;
   first program instructions to receive a request for a set of cloud resources, wherein the set of cloud resources comprises at least one cloud resource that has been associated with an ontological database, wherein the ontological database defines descriptive terms for said at least one cloud resource, wherein the ontological database describes relationships between the descriptive terms used by different cloud resources, wherein the ontological database describes requisite co-components required by two cloud resources, wherein the ontological database contains a definition of an application resource in the cloud resources, and wherein the definition of the application resource comprises a name of the application resource, a version number of the application resource, an enterprise java bean (EJB) container support version number of the application resource, a web container support version number of the application resource, a portal support version number of the application resource, a maximum number of users supported by the application resource, a high availability runtime of the application resource, an actual availability performance runtime of the application resource, a number of processors required by the application resource, and a memory size required by the application resource;
   second program instructions to configure an optimal set of cloud resources that satisfies the request, wherein the optimal set of cloud resources is defined as being available to a user at least 95% of the time; and
   third program instructions to save the optimal set of cloud resources in a computer-readable storage device for future usage in responding to requests for the set of cloud resources; and wherein
said first, second and third program instructions are stored on said computer readable storage media for execution by said processor via said computer readable memory.

17. The computer system of claim 16, wherein the ontological database utilizes Web Ontology Language (OWL).

18. The computer system of claim 16, further comprising:
   fourth program instructions to utilize the ontological database to establish hardware and software requirements for at least one cloud resource in the set of cloud resources, wherein said fourth program instructions are stored on said computer readable storage media for execution by said processor via said computer readable memory.

19. The computer system of claim 16, wherein the set of cloud resources comprises a single cloud resource.

20. The computer system of claim 16, wherein the set of cloud resources comprises multiple cloud resources.

* * * * *